(12) United States Patent
He et al.

(10) Patent No.: US 10,794,725 B2
(45) Date of Patent: Oct. 6, 2020

(54) WATER ENCODING FOR VISION SYSTEMS

(71) Applicant: HONEYWELL INTERNATIONAL INC., Morris Plains, NJ (US)

(72) Inventors: Gang He, Morristown, NJ (US); Thea L. Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 317 days.

(21) Appl. No.: 15/861,865

(22) Filed: Jan. 4, 2018

(65) Prior Publication Data
US 2019/0204113 A1  Jul. 4, 2019

(51) Int. Cl.
| | |
|---|---|
| *G01C 23/00* | (2006.01) |
| *G01C 21/16* | (2006.01) |
| *G09B 29/00* | (2006.01) |
| *G09B 29/10* | (2006.01) |
| *G01S 19/42* | (2010.01) |
| *G08B 5/02* | (2006.01) |
| *G02B 27/01* | (2006.01) |
| *G08G 5/02* | (2006.01) |

(52) U.S. Cl.
CPC ......... *G01C 23/005* (2013.01); *G01C 21/165* (2013.01); *G01C 23/00* (2013.01); *G09B 29/007* (2013.01); *G09B 29/106* (2013.01); *G01S 19/42* (2013.01); *G02B 2027/0141* (2013.01); *G08G 5/025* (2013.01)

(58) Field of Classification Search
CPC .... G01C 23/005; G01C 21/165; G01C 23/00; G09B 29/007; G09B 29/106
See application file for complete search history.

(56) References Cited

U.S. PATENT DOCUMENTS

| | | |
|---|---|---|
| 8,264,498 B1 | 9/2012 | VanDerkamp et al. |
| 9,582,857 B1 | 2/2017 | Kolesinski |
| 2010/0097241 A1* | 4/2010 | Suddreth ............... G01C 23/00 340/972 |

FOREIGN PATENT DOCUMENTS

WO  2007/002916 A1  1/2007

* cited by examiner

*Primary Examiner* — Michael D Lang
(74) *Attorney, Agent, or Firm* — Lorenz & Kopf, LLP

(57) ABSTRACT

Technologically improved vision systems and methods that provide enhanced water encoding are provided. The vision system receives terrain data from a terrain database and aircraft state data from a navigation system. The vision system commands a display system to display a map image that is reflective of a view from a current location of the platform. The vision system processes terrain data and aircraft state data to identify a water feature, determine a distance between the platform and the water feature, and determine a textural representation for the water feature. The textural representation comprises a symbol and an associated symbol pattern. The vision system commands a display system to overlay, on the map image, the water feature with the textural representation.

18 Claims, 7 Drawing Sheets

WATER ENCODING FOR VISION SYSTEMS

TECHNICAL FIELD

The present invention generally relates to mobile platform vision systems, and more particularly relates to water encoding for vision systems.

BACKGROUND

Generally, vision systems comprise head down displays and head up displays. In a synthetic vision system (SVS) head down display (HDD), land, water, and sky are represented by distinctly different colors for easy pilot distinction and situation awareness. In an enhanced vision system, Infrared images represent thermal signature of forward field of view, and may or may not provide distinction of water and land areas via perceived intensity. In a combined vision system (CVS) HDD, an SVS image and an EVS image are combined into one image. In the CVS HDD image, an EVS video insert section is may be colored by the background land/water/sky colors of the SVS image.

In contrast to the HDD, a head mounted display (HMD), near to eye display (NTE), and a head up display (HUD) must be useable over a wide range of ambient light conditions and display is typically of single color. Therefore, using intensity to differentiate between water, land, and sky can be ineffective on a HUD, particularly in bright ambient conditions. Displaying SVS images and/or CVS images in a typical mono-color using color intensity to differentiate between water, land, and sky, may be especially ineffective.

Accordingly, improvements to vision systems and methods are desirable. Specifically, technologically improved systems and methods that provide enhanced water encoding and supports a wide variety of vision systems are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method for a vision system in a platform is provided. The method comprising: at a control module, receiving terrain data from a terrain database; receiving aircraft state data from a navigation system; displaying, on a display system, an image that is reflective of a view from a current location of the platform; processing the terrain data and the aircraft state data to (i) identify a water feature, and (ii) determine a textural representation for the water feature; and texturizing the water feature by overlaying, on the image, the water feature with the textural representation.

Also provided is a vision system, comprising: a navigation system; a display system; a terrain database; and a control module operationally coupled to the navigation system, the display system, and the terrain database, the control module configured to: receive terrain data from the terrain database; receive aircraft state data from the navigation system; display, on the display system, a map image that is reflective of a view from a current location of the platform; process the terrain data and the aircraft state data to (i) identify a water feature, and (ii) determine a textural representation for the water feature; and texturize the water feature by overlaying, on the map image, the water feature with the textural representation.

A control module for use in a combined vision system (CVS) on an aircraft having a navigation system is provided. The control module comprising: a memory comprising terrain data; and a processor operationally coupled to the memory and configured to process terrain data and aircraft state data to: generate display commands for a display system to generate a map image that is reflective of a view from a current location of the aircraft; identify a water feature; and determine a textural representation for the water feature.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed vision system 102 and control module (FIG. 1, 104) effectively texturize a water feature by determining a textural representation for the water feature, and commanding a display system (FIG. 1, 30) to overlay a map image with the textural representation. The selected symbol and symbol pattern may be related to a distance between the aircraft 100 the water feature; and, the selected symbol and symbol pattern may change as the aircraft 100 crosses one or more range boundaries of distance from the water feature. With the herein described texturizing of the water feature(s), and some of the additional features described below, the control module 104 delivers a technological improvement over conventional vision systems that require an undue workload to distinguish water from land, particularly in monochrome applications and across a range of ambient lighting conditions. These features and additional functionality are described in more detail below.

Figure 1:
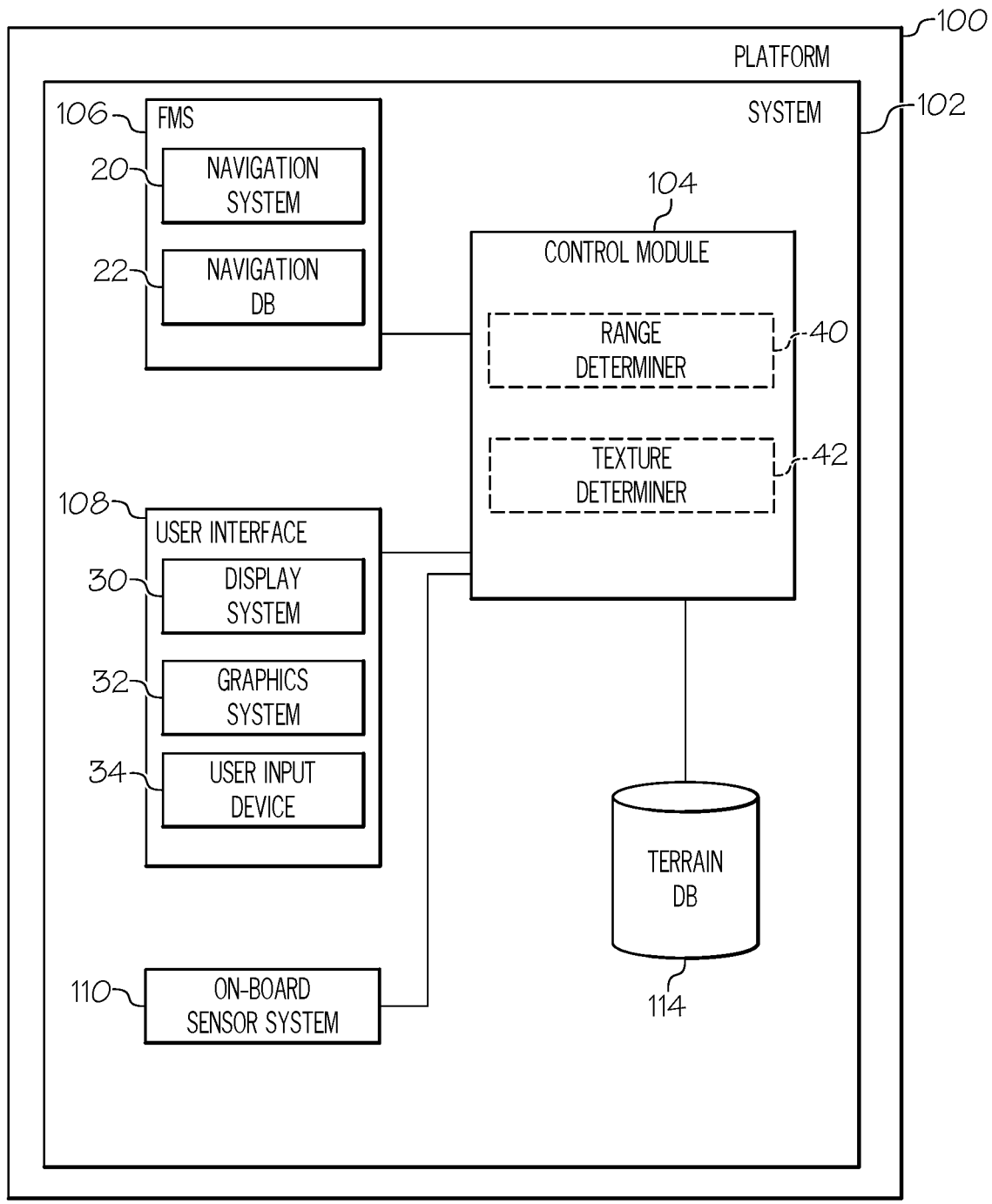
FIG. 1 is a block diagram of an enhanced vision system, in accordance with an exemplary embodiment.

Turning now to FIG. 1, in the provided examples, the platform 100 is an aircraft, and may be referred to as aircraft 100. In the described embodiments, a control module 104 is generally realized as commanding a technologically enhanced vision system 102 (also referred to as "water encoding system" 102, and "system" 102) within the aircraft 100. In the described embodiments, the control module 104 and vision system 102 are within the aircraft 100; however, the concepts presented herein can be deployed in a variety of mobile platforms, spacecraft, and the like. Accordingly, in various embodiments, the control module 104 may reside elsewhere and/or enhance part of larger avionics management system, or platform management system. Further, it will be appreciated that the system 102 may differ from the embodiment depicted in FIG. 1. For example, aspects of the user input device 34, display system 30, and graphics system 32 may form a control display unit (CDU) used for command and control of the FMS 106.

The control module 104 may be operationally coupled to: a Flight Management System (FMS) 106, a user interface 108 (which may comprise one or more of a display system 30, a graphics system 32, and a user input device 34), an on-board sensor system 110, and a terrain database 114. The operation of these functional blocks is described in more detail below.

Figure 2:
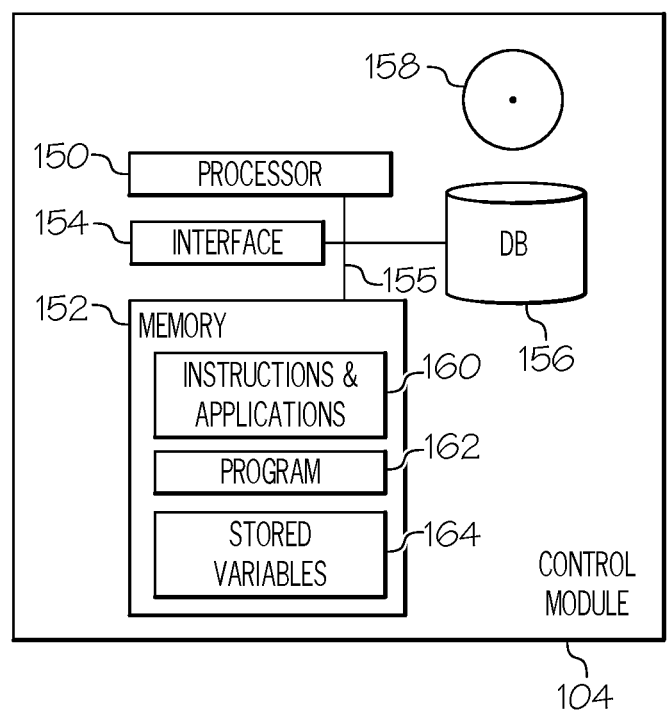
FIG. 2 is a block diagram of the control module of FIG. 1, in accordance with an exemplary embodiment.

The depicted FMS 106 provides a flight plan and a destination runway for an intended landing. As depicted, the FMS 106 is a functional block that comprises a navigation system 20 and a navigation database 22, and may therefore provide position determination data retrieved from sensor components in the navigation system 20 The navigation system 20 comprises sensors for determining instantaneous current position for the aircraft 100. The instantaneous current position of a platform or aircraft 100 may be referred to as aircraft state data, and/or position determining data, and comprises the current latitude, longitude, heading, and the current altitude (or above ground level) for the aircraft 100. The means for ascertaining current or instantaneous aircraft state data for the aircraft 100 may be realized, in various embodiments, as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 20, as will be appreciated in the art. Under direction of the program 162 (see FIG. 2), the control module 104 may process navigation data to determine an aircraft instantaneous position with respect to a flight plan and guide the aircraft along the flight plan. The control module 104 may also process the flight plan and position determining data to determine a current phase of flight.

The navigation database 22 may comprise waypoint information, airport features information, runway position and location data, holding patterns, flight procedures, approach procedures, and various flight planning and distance measuring rules and parameters. The FMS 106 is configured to provide guidance, such as lateral navigation (LNAV) and vertical navigation (VNAV), to a crew, based on processing the aircraft state data with information within the navigation database 22. As used herein, "navigation data" may comprise data and information from the navigation system 20 and/or the navigation database 22, such as, but not limited to, aircraft state data and current phase of flight information.

A user interface 108 is coupled to the control module 104, and cooperatively configured to allow a user (e.g., a pilot, co-pilot, or crew member) to interact with the display system 30, the FMS 106, and/or other elements of the system 102 in a conventional manner. The user interface 108 comprises one or more systems (display system 30, a graphics system 32, and a user input device 34) described below.

In general, the display system 30 may include any device or apparatus suitable for displaying (also referred to as rendering) flight information or other data associated with operation of the aircraft in a format viewable by a user. The display devices may provide three dimensional or two dimensional map images, and may further provide synthetic vision imaging. Accordingly, a display device responds to a respective communication protocol that is either two-dimensional or three, and may support the overlay of text, alphanumeric information, or visual symbology on a given map image. Non-limiting examples of such display devices include cathode ray tube (CRT) displays, and flat panel displays such as LCD (liquid crystal displays) and TFT (thin film transistor) displays. In practice, the display system 30 may be part of, or include, a primary flight display (PFD) system, a multi-function display (MFD), a panel-mounted head down display (HDD), a head up display (HUD), or a head mounted display system, such as a "near to eye display" system. With respect to the present embodiments, focus will be on the head up display (HUD).

The renderings of the display system 30 may be processed, at least in part, by the graphics system 32. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In some embodiments, the graphics system 32 may be integrated within the control module 104; in other embodiments, the graphics system 32 may be integrated within the display system 30. Regardless of the state of integration of these subsystems, responsive to receiving display commands from the control module 104, the display system 30 displays, renders, or otherwise visually conveys, one or more graphical representations or images associated with operation of the aircraft 100, as described in greater detail below. In various embodiments, images displayed on the display system 30 may also be responsive to processed user input that was received via a user input device 34.

The user input device 34 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 34 include: entering values for stored variables 164, loading or updating instructions and applications 160, loading and updating program 162, and loading and updating the contents of the database 156, each described in more detail below. In addition, pilots or crew may enter flight plans, Standard Operating Procedures (SOP), and the like, via the user input device 34. In embodiments using a touch sensitive screen, the user input device 34 may be integrated with a display device in display system 30.

The on-board sensor system 110 comprises a variety of different sensors, each directed to sensing a respective different system of the aircraft 100 while in flight. Non-limiting examples of sensors include: wind direction and velocity sensors, fuel-level sensors, engine temperature sensors, humidity sensors, cabin sensor sensors, and other system status sensors. In addition to sensing aircraft 100 systems while in flight, some of the on-board sensors are externally focused, and provide environmental and terrain information. Real-time aircraft sensor data, therefore, includes real-time local weather data and infra-red sensed data, as expected for use in an enhanced vision system (EVS), in addition to, aircraft system data.

The terrain database 114 comprises environmental features information relevant to a travel path that the aircraft 100 will take. Non-limiting examples of terrain data from the terrain database includes sizes, shapes, areas, locations (latitude, longitude, feet above sea level), and boundaries between land, air, and water features. The terrain data may be pre-loaded into the terrain database 114, and then selectively transferred to memory 152 during execution of algorithms for texturizing the water features embodied in program 162. In other embodiments, the terrain data is already included in the control module 104, such as in database 156.

The control module 104 processes input from the operationally coupled components and performs the functions of: range determining 40, and texture determining 42. The control module 104 and its functions are further described in connection with FIG. 2, as follows.

The control module 104 includes an interface 154, communicatively coupled to a processor 150 and memory 152 (via a bus 155), database 156, and an optional storage disk 158. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the navigation database 22, the terrain database 114, the database 156, and optional disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database 156 may include an airport database (comprising airport features) and a terrain database (comprising terrain features), parameters and instructions for runway detection and selection, and parameters and instructions for generating alerts as described herein. In combination, the features from the airport database and the terrain database are referred to as map features. Information in the database 156 and memory 152 may be organized and/or imported from an external source 130, or by programming via the user input device 34, during an initialization step of a process (see initialization 702 FIG. 7).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 130 directly. The interface 154 may also include one or more network interfaces to communicate with technicians, and/or one or more storage interfaces supporting direct connections with storage apparatuses, such as the database 156.

Figure 7:
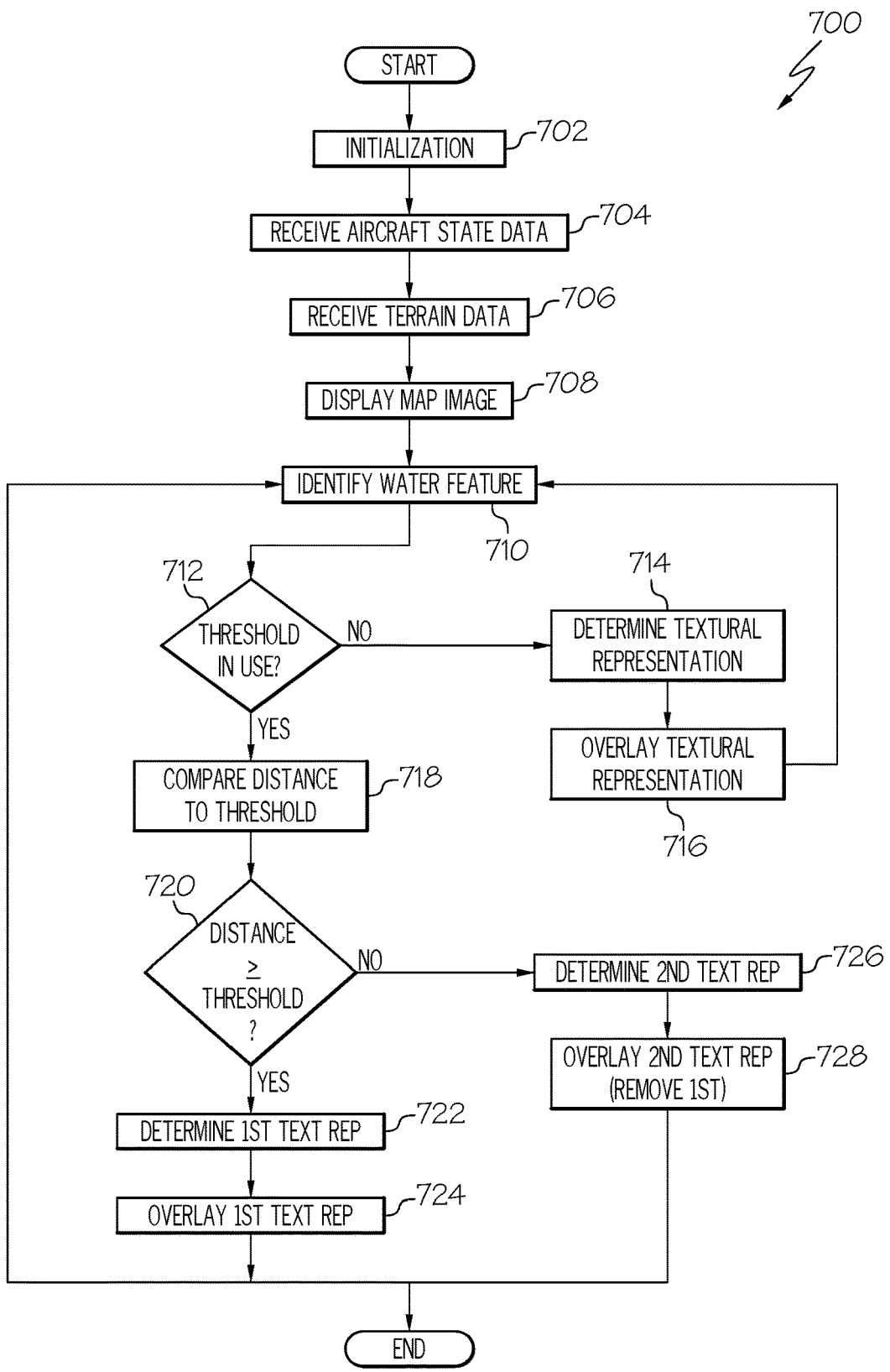
FIG. 7 is a flow chart for a method for water encoding, in accordance with an exemplary embodiment.

During operation, the processor 150 loads and executes one or more programs, algorithms and rules embodied as instructions and applications 160 contained within the memory 152 and, as such, controls the general operation of the control module 104 as well as the system 102. In executing the process described herein, such as the method 700 of FIG. 7, the processor 150 specifically loads and executes the instructions and models embodied in the novel program 162. Within the control module 104, the processor 150 and the memory 152 form a processing engine performing processing activities, data conversion, and data translation that result in the functions of the control module 104, as is described in more detail below. The control module 104 may perform its functions in accordance with steps of a method (FIG. 7, method 700).

Additionally, the processor 150 is configured to, in accordance with the program 162: process received inputs (selectively, any combination of input from the set including: the FMS 106, the user interface 108, the on-board sensor system 110, the input/output (I/O) system 112, and external sources 130); reference any of the databases (such as, the terrain database 114, the navigation database 22, and the database 156); and, generate commands that command and control the user interface 108 (specifically, the display system 30).

Figure 3:
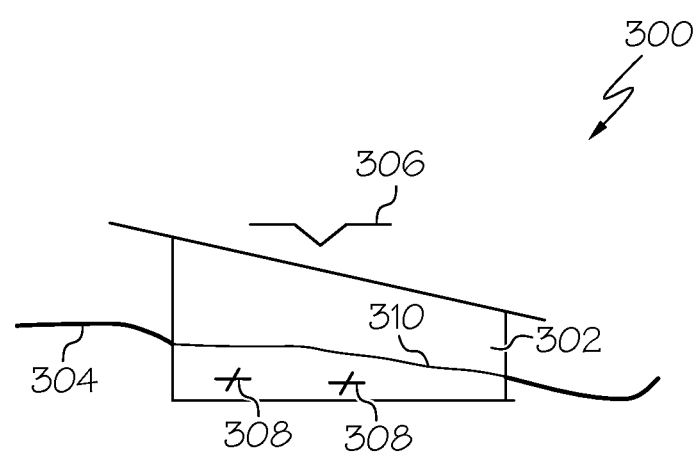
FIG. 3 is sketch illustrating water encoding in a combined vision system (CVS), in accordance with an exemplary embodiment.

Generally, the control module 104 determines a textural representation for a water feature, and commands the display system 30 to overlay the textural representation on the synthetic vision system (SVS) map image. This is also referred to as "texturizing the water." In FIG. 3, sketch 300 represents this concept in a combined vision system (CVS) image having an SVS image overlaid with an EVS image 302. The SVS water boundary 304 is shown below a zero pitch reference line ZPRL 306. In the EVS image 302, the water boundary is 310. The textural representation used for the water feature comprises a symbol 308 that is repeated throughout the water feature, within the water boundaries (304, 310) of the water feature. The water symbol 308 may be selectively positioned on top of EVS image for the areas within the water boundaries. The repetition of the symbol 308 may follow a pre-arranged symbol pattern. The arrangement of symbols 308 into symbol patterns is described in connection with FIGS. 4-6.

Figure 4:
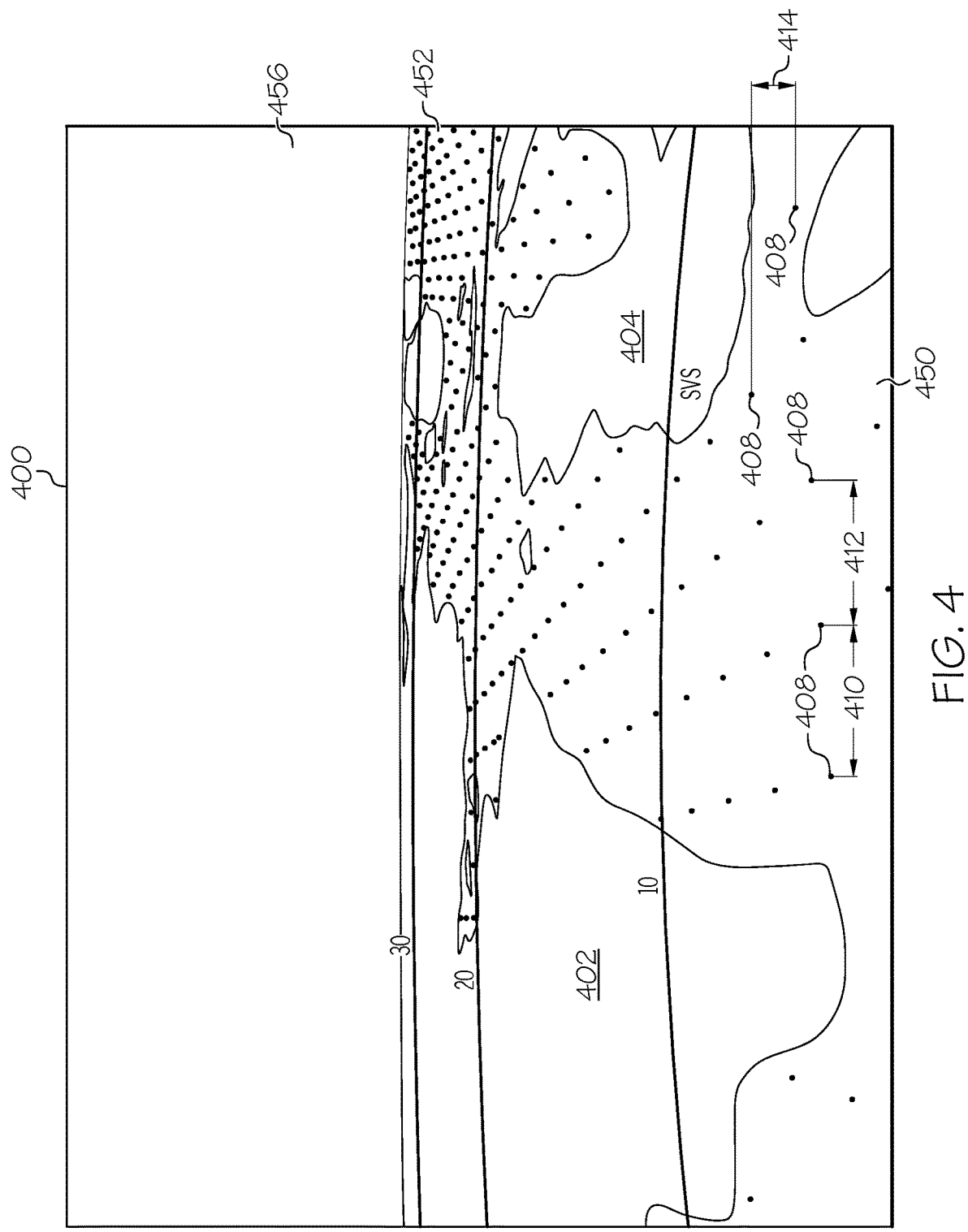
FIG. 4 is a long range image from a head up display (HUD), in accordance with an exemplary embodiment.

The water encoding system 102 commands the display system 30 to render a map image reflective of a view from the current location of the vehicle. The top of the map image is representative of features farthest away from the aircraft 100, and the bottom of the map image is representative of features nearest to the aircraft 100. Turning now to FIG. 4, a perspective view image, SVS image 400, represents a view of the terrain and environment from the platform looking forward, in the direction of travel. At the top of the SVS image 400, the sky 456 extends downward to a boundary 452 where sky 456 meets the water feature 450, land body 402 and land body 404. As the aircraft 100 travels, the SVS image 400 is continuously updated to reflect the aircraft 100 state data (position and location). Boundary 452 is a virtual boundary, meaning that it represents the farthest extent of the displayed view from the aircraft 100, rather than a real boundary between features as defined in the terrain database 114. For the purpose of the present discussion, the boundaries displayed on the map image are the boundaries used for determining the water feature to texturize. Accordingly, depending on the aircraft's 100 instantaneous position and location, a given boundary of a water feature may be real or virtual.

The control module 104 determines a textural representation for the water feature 450. The control module 104 generates display commands for the display system 30 to texturize the water feature 450. Responsive to the display commands, the display system 30 texturizes the water feature 450 by overlaying, on the map image (SVS image 400), the water feature with the textural representation. Textural representations are selected to provide enough contrast around the water texture symbols such that, when overlaid on a map image that employs coloration techniques, the textural representations continue to be plainly visible and distinguishable. For example, the texturized water feature 450 may be easily brought into and rendered on a HUD CVS image.

In various embodiments, the textural representation comprises a symbol and an associated symbol pattern. It is to be understood that multiple symbols may be employed, and also multiple symbol patterns may be employed, and each may selectively be associated with each other. A given symbol pattern may comprise dimensions that are responsive to one or more of (i) water feature 450 dimensions, and (ii) a location of the aircraft 100 with respect to the water feature 450. In addition, the symbol dimensions may be based on one or more of (i) symbol pattern dimensions, (ii) water feature 450 dimensions, and (iii) a location of the aircraft 100 with respect to the water feature 450.

Continuing with FIG. 4, the map image of SVS image 400 depicts a symbol 408 (a plus sign or cross) repeated in a symbol pattern. The first symbol pattern is a grid of rows and columns, each row separated from its neighbor rows by a row space 414, and each column separated by a column space (a column space 410 and a column space 412) from its neighbor columns. The symbol 408 is generally distributed in the first symbol pattern such that one symbol 408 occupies each intersection of a row and a column. Said differently, the symbols 408 are separated from each other by the row space 414 and a column space (column space 410 and/or column space 412). In some textural representations, the symbol pattern has the column space 410 and the column space 412 equal. In other textural representations, the column space 410 and the column space 412 are not equal. In some embodiments, columns are parallel with each other, and perpendicular to rows. As stated earlier, multiple other symbol patterns are supported.

Distance between the aircraft and the water feature 450 may be visually communicated with the textural representation. For example, in the map image SVS image 400, the column spaces 410 and 412 are wider at the bottom and narrower at the top, to indicate perspective, or distance between the aircraft 100 and the water feature. Distance between the aircraft and the water feature 450 may also be visually communicated by altering the textural representation based on a predetermined configurable distance called a threshold range.

When a threshold range is employed, the control module 104 compares a range, or distance, between the aircraft 100 and the water feature to the threshold range. The change from one side of the threshold range to the other is rendered in a manner that is visually distinguishable. For example, when the distance between the aircraft 100 and the water feature 450 is less than or equal to the threshold range, one textural representation may be employed, and when the distance from the aircraft 100 to the water feature 450 is greater than the threshold range, the textural representation may be modified or another textural representation may be employed. Selectively, any combination of the symbol and symbol pattern described above may be utilized in textural representations based on the threshold range.

To demonstrate this concept, consider the textural representation overlaid on the map image in FIG. 4 to be an example of one textural representation, in which the distance between the aircraft 100 and the water feature 450 is less than, or equal to, the threshold range. While the plus sign of symbol 408 is readily visually distinguishable as shown, viewing the same water feature from farther away may result in crowding a plurality of symbol 408 into a small map image space, making them difficult to distinguish. An increase of texture density may be employed by the control module 104 as aircraft 100 gets closer to the ground to enhance ground closure perceptual cues—e.g., you first see the forest, then you see the tree and as you get closer you see tree branches and then really close you see the leaves. Comparing FIG. 4 to FIG. 5, a different textural representation is utilized when aircraft 100 is farther away.

Figure 5:
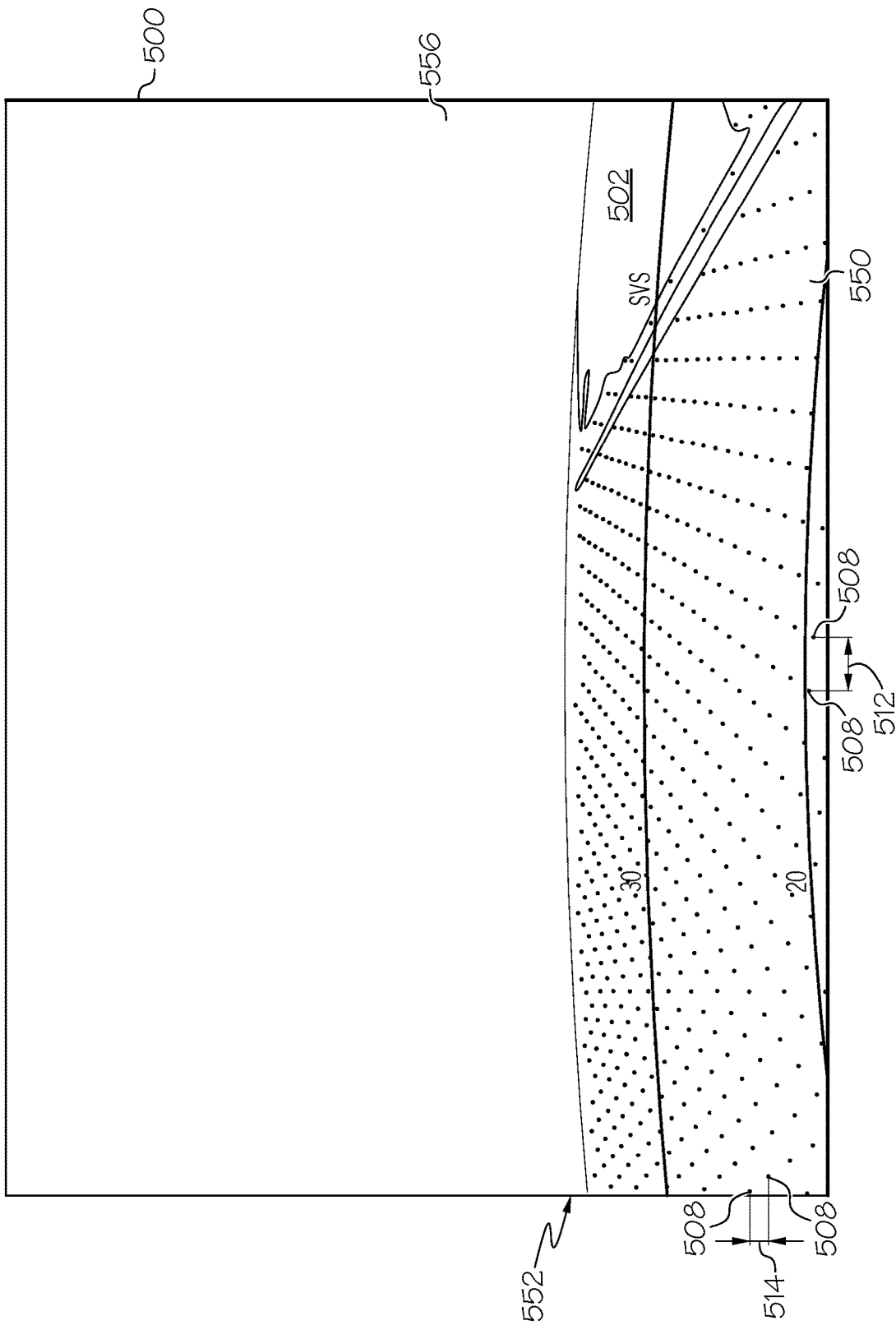
FIG. 5 is a head up display (HUD) image showing natural landmarks, in accordance with an exemplary embodiment.

In FIG. 5, the distance of the aircraft 100 to the water feature 550 has been determined to be greater than the threshold range. In FIG. 5, SVS image 500 shows a boundary 552 separating the water feature 550 from the sky 556. Land is denoted at 502. A color intensity change is employed for a mono-color map image of SVS 500. In FIG. 5, the textural representation utilized comprises a symbol 508 (a dot) that is visually distinguishable from the plus sign of symbol 408, and is more adaptable to a crowded map image. Symbol 508 is distributed in rows and columns across the water feature 550. In addition to employing a different symbol at a greater distance, column space 512 and row space 514 may also be visually distinguishable (i.e., different size) from row space 414, column space 410 and a column space 412.

Figure 6:
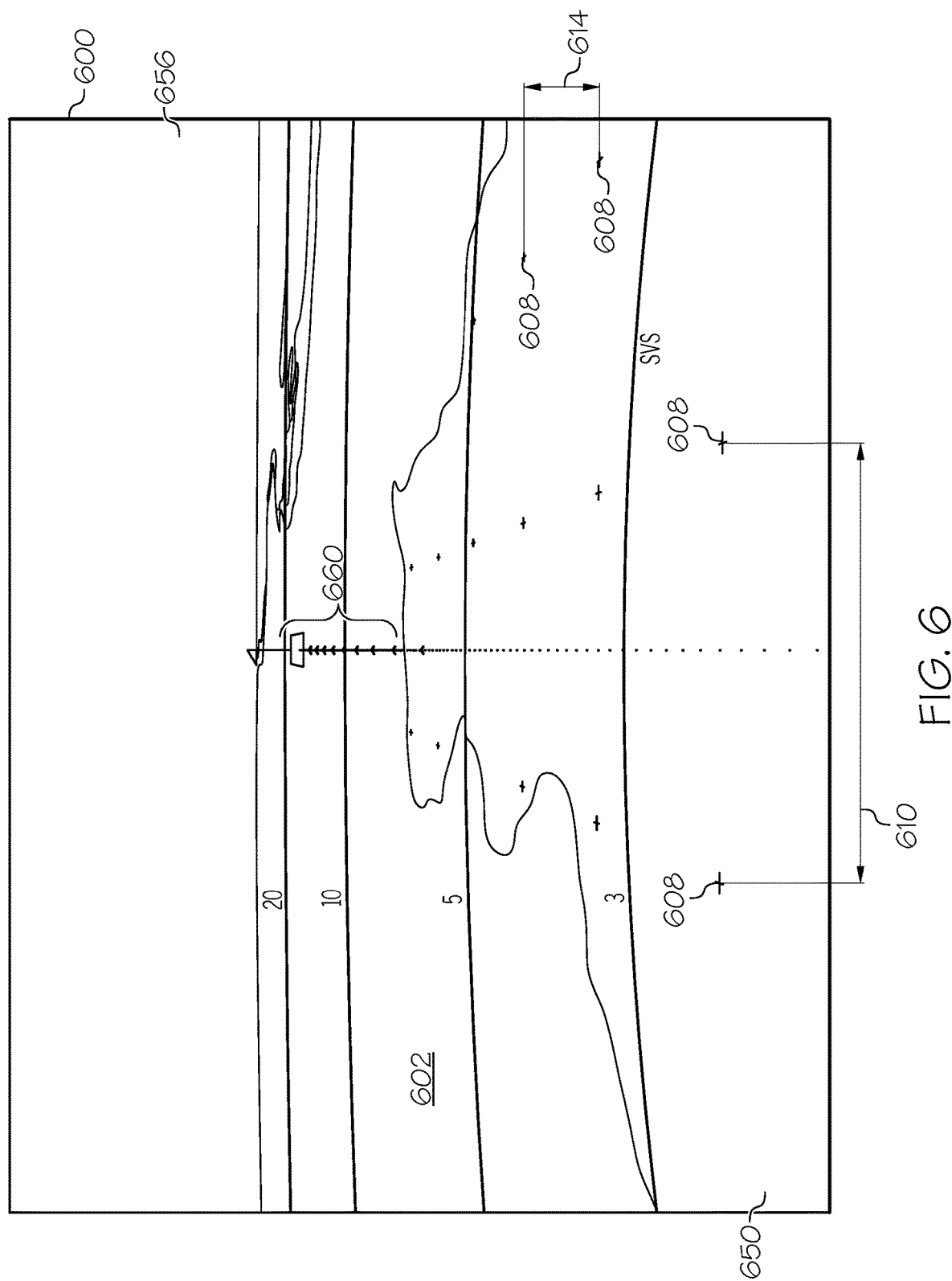
FIG. 6 is a short range image from a head up display (HUD), in accordance with an exemplary embodiment.

Symbols and symbol patterns are also selected to be readily visually distinguishable from symbols used to represent natural landmarks; an example of this is depicted in FIG. 6. SVS image 600 depicts water feature 650, land 602 and sky 656. Symbols 608 are distributed throughout the water feature 650, separated from each other by a column space 610 and a row space 614. Symbols and symbol patterns used for a land features, such as a landing strip 660, is shown. As is observable, symbols 608 are easily visually distinguishable from symbols used for landing strip 660, and from other symbols, like a symbol indicating a synthetic enhanced runway extended centerline As mentioned, the control module 104 may be used to implement a method 700, as shown in the flow chart of FIG. 7. For illustrative purposes, the following description of method 700 may refer to elements mentioned above in connection with FIG. 1 and FIG. 2. In practice, portions of method 700 may be performed by different components of the described system. It should be appreciated that method 700 may include any number of additional or alternative tasks, the tasks shown in FIG. 7 need not be performed in the illustrated order, and method 700 may be incorporated into a more comprehensive procedure or method having additional functionality not described in detail herein. Moreover, one or more of the tasks shown in FIG. 7 could be omitted from an embodiment of the method 700 as long as the intended overall functionality remains intact.

The method starts, and at 702 the control module 104 is initialized. As mentioned above, initialization may comprise uploading or updating instructions and applications 160, program 162, stored variables 164, and the various lookup tables stored in the database 156. Examples of parameters that may be stored in stored variables 164 include parameters used by the instructions and applications 160 and the program 162 (for example, a predetermined configurable range, and values used for scaling and sizing the texture symbols and their placement in various symbol patterns). Stored variables 164 may also include various shapes, sizes, and color rendering references for flight images, buttons and displays such as employed on a graphical user interface (GUI) displayed on the display system 30, for seeking user input. The program 162 may also include additional instructions and rules for commanding any of a variety of the specific display devices described in connection with the display system 30.

At 704, aircraft state data is received. As mentioned, aircraft state data comprises position determining data provided via the navigation system 20; the aircraft state data, therefore, comprises the aircraft's 100 instantaneous, real-time, position and location. At 706, terrain data is received. Terrain data may be received from the terrain database 114. In some embodiments, the terrain data is already copied into memory (such as memory 152 or database 156) within the control module 104. Terrain data comprises the requisite boundaries and feature information to distinguish the environment (i.e., distinguish between land, water, and air) along a flight path of the aircraft 100. At 708, the control module 104 commands a display system 30 to render a map image that is reflective of a view from the current location of the aircraft 100. It is to be understood that the map image comprises information about the terrain surrounding the aircraft 100. Step 708 is continuously repeated, such that the map image continuously reflects the view from the current location of the aircraft 100 as it travels.

At 710, terrain data and aircraft state data are processed to identify a water feature (450, 550, and 650) in a travel path of the aircraft 100 and to determine a location of the aircraft 100 with respect to the water feature. As mentioned, a predetermined configurable threshold range may be employed. If not, at 712, a textural representation is determined for the water feature (450, 550, and 650) at 714 and the textural representation is overlaid on the water feature on the map image at 716. In embodiments using a predetermined configurable threshold the distance (between the aircraft 100 and the water feature 550) to the threshold range, at 712, the method 700 proceeds to compare the distance (between the aircraft 100 and the water feature (450, 550, 650)) to the threshold range at 718. While the distance is greater than the threshold range, the first textural representation is determined at 722 and overlaid at 724. Once the distance becomes less than the threshold range at 720, a second textural representation is determined at 726 and overlaid at 728. It is to be understood that when the second textural representation is utilized at 728, the first textural representation is removed. This is also true any time that the method determines a new textural representation that utilizes a different symbol and/or symbol pattern. After 728 and after 724 the method may end or may return to 710.

Accordingly, the exemplary embodiments discussed above provide a technologically improved vision system 102 that determines textural representations for water features and encodes them for use in a variety of display systems, and specifically for systems that cannot rely on color intensity for land/water/sky differentiation. The embodiments determine textural representations that vary responsive to a distance between a platform and a water feature.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for a vision system in a platform, the method comprising:
   at a control module,
   receiving terrain data from a terrain database;
   receiving aircraft state data from a navigation system;
   displaying, on a display system, an image that is reflective of a view from a current location of the platform;
   processing the terrain data and the aircraft state data to (i) identify a water feature, and (ii) determine a textural representation comprising a symbol arranged in an associated symbol pattern, for the water feature; and
   texturizing the water feature by overlaying, on the image, the water feature with the textural representation, thereby repeating the symbol and symbol pattern throughout the water feature.

2. The method of claim 1, wherein the symbol pattern of the textural representation comprises dimensions that are responsive to a distance between the platform and the water feature.

3. The method of claim 2, further comprising adjusting symbol dimensions in accordance with the symbol pattern dimensions.

4. The method of claim 3, further comprising determining the textural representation based on a comparison of a threshold range and the distance between the platform and the water feature.

5. The method of claim 4, further comprising determining that the distance between the platform and the water feature is greater than the threshold range; and
employing a first textural representation responsive thereto.

6. The method of claim 5, further comprising determining when the distance between the platform and the water feature is less than or equal to the threshold range; and
employing a second textural representation responsive thereto.

7. The method of claim 1, wherein the symbol or symbol pattern comprises dimensions that are responsive to water feature dimensions.

8. A vision system, comprising:
a navigation system;
a display system;
a terrain database; and
a control module operationally coupled to the navigation system, the display system, and the terrain database, the control module configured to:
receive terrain data from the terrain database;
receive aircraft state data from the navigation system;
display, on the display system, a map image that is reflective of a view from a current location of the platform;
process the terrain data and the aircraft state data to (i) identify a water feature, and (ii) determine a textural representation comprising a symbol arranged in an associated symbol pattern for the water feature; and
texturize the water feature by overlaying, on the map image, the water feature with the textural representation, thereby repeating the symbol and symbol pattern throughout the water feature.

9. The system of claim 8, wherein the symbol pattern comprises dimensions that are responsive to a distance between the platform and the water feature.

10. The system of claim 9, wherein the symbol pattern dimensions are additionally responsive to water feature dimensions.

11. The system of claim 10, wherein the control module is further configured to adjust symbol dimensions in accordance with the symbol pattern dimensions.

12. The system of claim 8, wherein the control module is further configured to determine the textural representation based on a comparison of a threshold range and a distance between the platform and the water feature.

13. The system of claim 12, wherein the control module is further configured to:
determine that the distance between the platform and the water feature is greater than the threshold range; and
employ a first textural representation responsive thereto.

14. The system of claim 13, wherein the control module is further configured to:
determine when the distance between the platform and the water feature is less than or equal to the threshold range; and
employ a second textural representation responsive thereto.

15. A control module for use in a combined vision system (CVS) on an aircraft having a navigation system, the control module comprising:
a memory comprising terrain data; and
a processor operationally coupled to the memory and configured to process terrain data and aircraft state data to:
generate display commands for a display system to generate a map image that is reflective of a view from a current location of the aircraft;
identify a water feature; and
determine a textural representation for the water feature comprising a symbol repeated throughout the water feature that is plainly visible and distinguishable when overlaid on a synthetic vision system (SVS) map image that employs coloration techniques.

16. The control module of claim 15, wherein the processor is further configured to generate commands for the display system to texturize the water feature by overlaying, on the map image, the water feature with the textural representation.

17. The control module of claim 16, wherein the textural representation comprises repeating the symbol in an associated symbol pattern, and wherein the symbol pattern comprises dimensions that are responsive to a distance between the aircraft and the water feature.

18. The control module of claim 17, wherein the processor is further configured to determine the textural representation based on a comparison of a threshold range and distance between the aircraft and the water feature.

* * * * *